Oct. 18, 1960     W. H. MEAD     2,956,840
TRANSFER VALVE
Filed March 9, 1959                          4 Sheets-Sheet 1
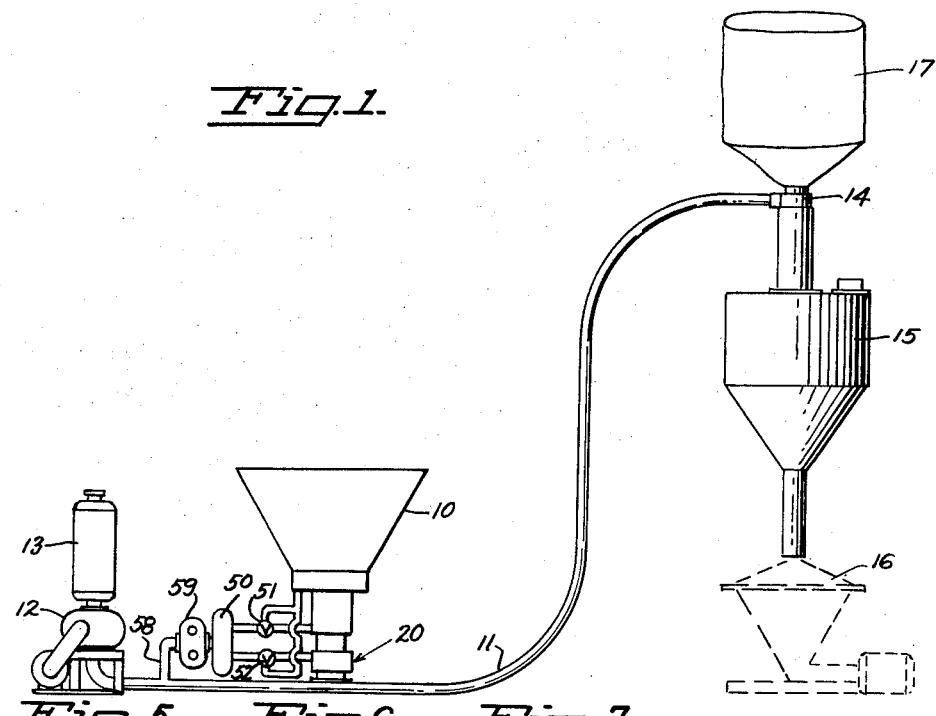
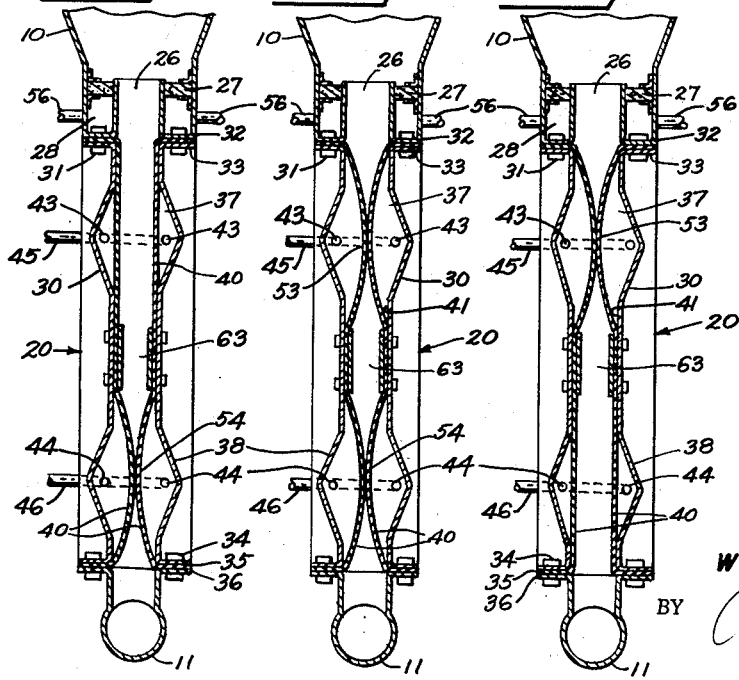
INVENTOR.
WILLIAM H. MEAD
BY
ATTORNEY.

Oct. 18, 1960

W. H. MEAD 2,956,840

TRANSFER VALVE

Filed March 9, 1959

INVENTOR.
WILLIAM H. MEAD
BY
ATTORNEY.

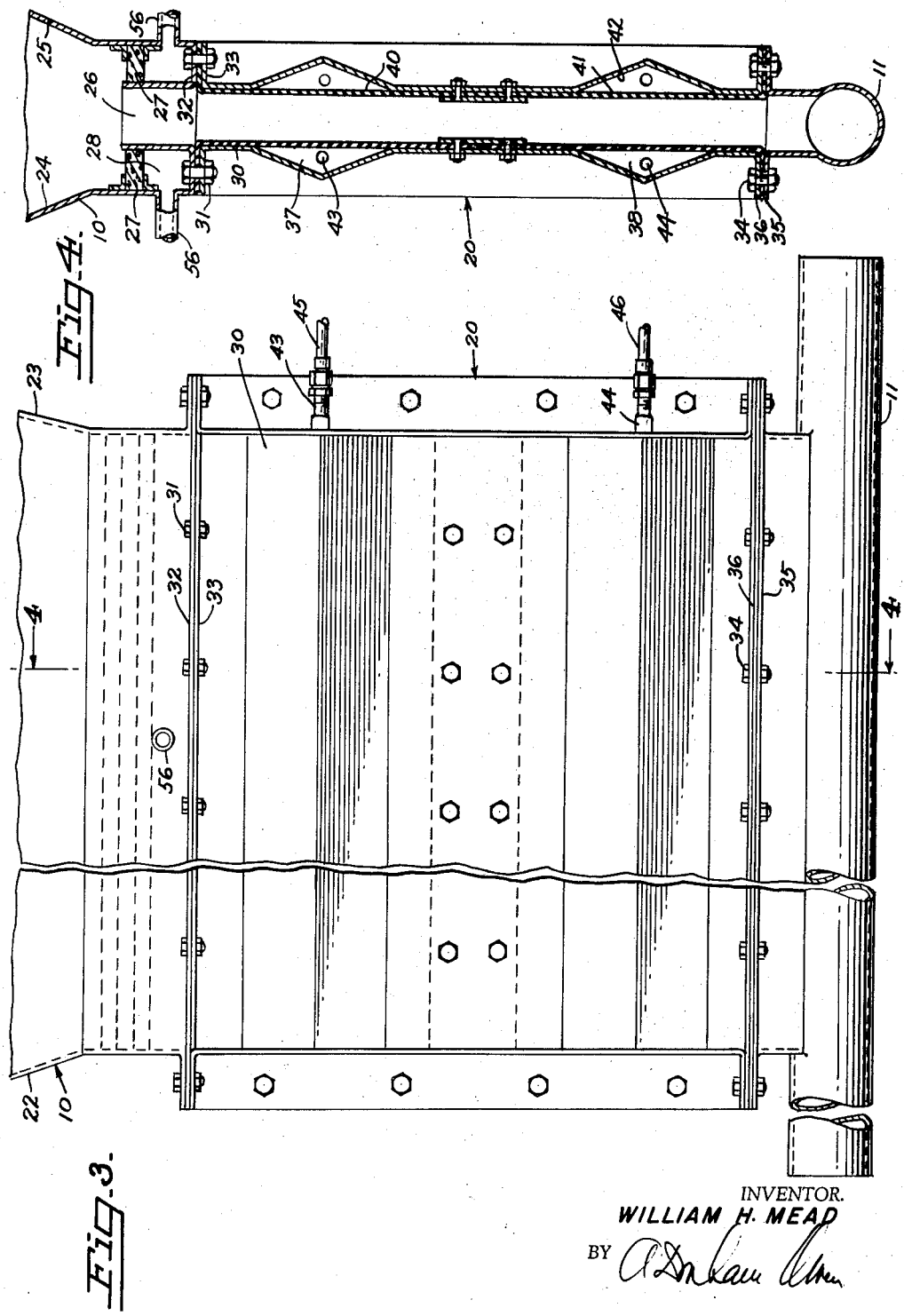

INVENTOR.
WILLIAM H. MEAD
BY
ATTORNEY

United States Patent Office 2,956,840
Patented Oct. 18, 1960

2,956,840

TRANSFER VALVE

William H. Mead, 202 Camino Al Lago, Atherton, Calif.

Filed Mar. 9, 1959, Ser. No. 798,229

3 Claims. (Cl. 302—55)

This invention relates to an unloading or transfer valve. More particularly, it relates to a lineal unloading valve for use in pneumatic conveyor systems and the like. It may also be used in other systems, however.

One of the most difficult problems in the pneumatic conveying art has been how to transfer granular or particulate material—such as Portland cement, sugar, sand, salt, and so on—from a storage vessel at atmospheric pressure to a pneumatic conveying line at pressure substantially higher than atmospheric. Heretofore, rotary valves have been used, but the abrasive nature of many granular materials has rapidly worn out such valves. The problem has been to get transfer without undue wear. Consequently an important object of this invention is to provide a valve that will transfer particulate material from atmospheric storage into a pressure line without any substantial wear on the valve, even when the material is an abrasive.

The present invention has solved the wear problem by providing a valve that may be made of pure gum rubber or other non-wearing elastomeric material and by so constructing the valve that there are no rubbing, close clearances.

Another problem has been that the unloader valves heretofore known have had to be of relatively small dimensions. They could remove granular material only from a hopper-bottomed vessel, wherein all four sides of the vessel converged toward the valve. Hence, another important object of this invention is to provide a substantially lineal unloading valve, which can be of any desired length. The valve of this invention may be installed in a storage vessel wherever screw conveyors have heretofore been installed. The length of the valve of this invention is not limited, as in rotary valves and other types heretofore in use. A single valve may be made many feet long, if desired, and it may be used in multiple for any desired length.

There are many uses for the valve of this invention. For example, railroad tank cars that are no longer suitable for liquid service may be given a new life by using the cars to transport bulk granular material, whether abrasive or otherwise, by simply installing valves of the present invention along the full length of the bottom of the car.

In general, the invention may be described as a lineal unloading valve in which the granular material is removed from a hopper under atmospheric pressure by first fluidizing the material in the hopper above the valve and then by alternately closing the chambers of a two-chamber valve. Both chambers are provided by gum rubber or other elastic walls and are opened and closed by pneumatic pressure in the outer surface of the walls. By using an intermediate chamber between the hopper and the pressure line itself, the transfer is made into the pressure line without affecting the pressure of either the hopper or the pressure line itself. Furthermore, the exhaust air from the pneumatic transfer valves may be used to effect the fluidization of the product. The valve may be operated either as a normally open or normally closed valve, and both forms of this will be discussed.

Other objects and advantages of the invention will become apparent from the following description of some preferred embodiments thereof.

In the drawings:

Fig. 1 is a view of a pneumatic conveying system incorporating a valve embodying the principles of the present invention.

Fig. 3 is a view in front elevation of the valve portion of the hopper assembly of Fig. 2, broken in the middle to conserve space, the upper portion of the hopper being broken off for the same reason.

Fig. 4 is a view in side elevation and in section taken along the line 4—4 in Fig. 3, the valve being shown here in its released, fully open, inoperative position, where no pressure is applied to either chamber.

Fig. 5 is a view like Fig. 4 but on a reduced scale, showing the valve of Fig. 4 with its upper chamber open and lower chamber closed during one portion of its operation cycle.

Fig. 6 is a view like Fig. 5, showing the valve with both chambers closed as in the next phase of operation.

Fig. 7 is a view like Fig. 6 with the lower valve open and the upper valve closed, in the next portion of the operative cycle.

Figure 10:
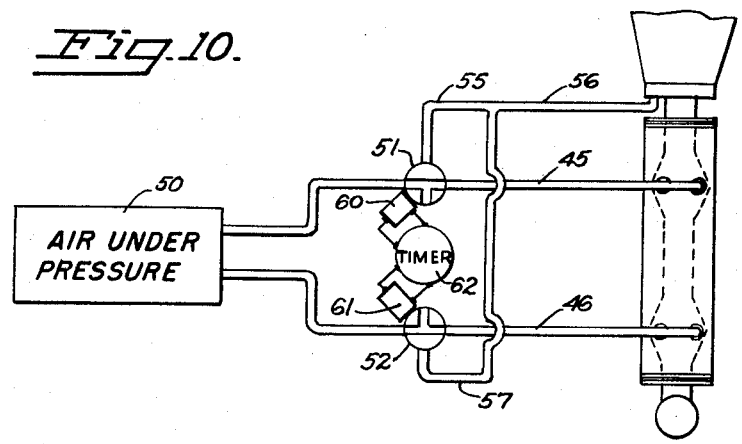
Fig. 10 is a diagrammatic view of the pneumatic circuit for the valve.

Fig. 1 shows an example of a pneumatic conveying system for conveying fine material from a hopper 10 through a conveyor tube, duct, or line 11 to a desired location. The material to be transported is placed into the hopper 10 at atmospheric pressure. A blower 12 draws in air through an inlet filter and silencer 13 and forces it at considerable pressure along the line 11. The air in the line 11 picks up granular material from the atmospheric-pressure hopper 10, and the problem is to get the granular material into the pressure line 11 without escape of air from the line 11 and then to convey the material by this pneumatic line 11 to another location and deposit it there. As an example of a depositing mechanism that may be used, the conveyor tube 11 is shown entering into a cyclone 14, where the solid material falls out into a hopper 15 from which it is withdrawn via a proportioning feeder 16. The air leaves the upper end of the cyclone 14 and passes to the atmosphere through a filter such as a puff bag 17.

The pressure line 11 is used simply to transport the granular material without having to carry it by a screw feed conveyor or other type of solids-moving apparatus. Were a conventional rotary valve used at the bottom of the hopper 10, abrasive material soon would wear out the rotary valve. By using a valve 20 of the present invention, highly abrasive material such as steel grit may be transferred into and conveyed by the line 11 without imparting wear to the valve structure.

Figure 2:
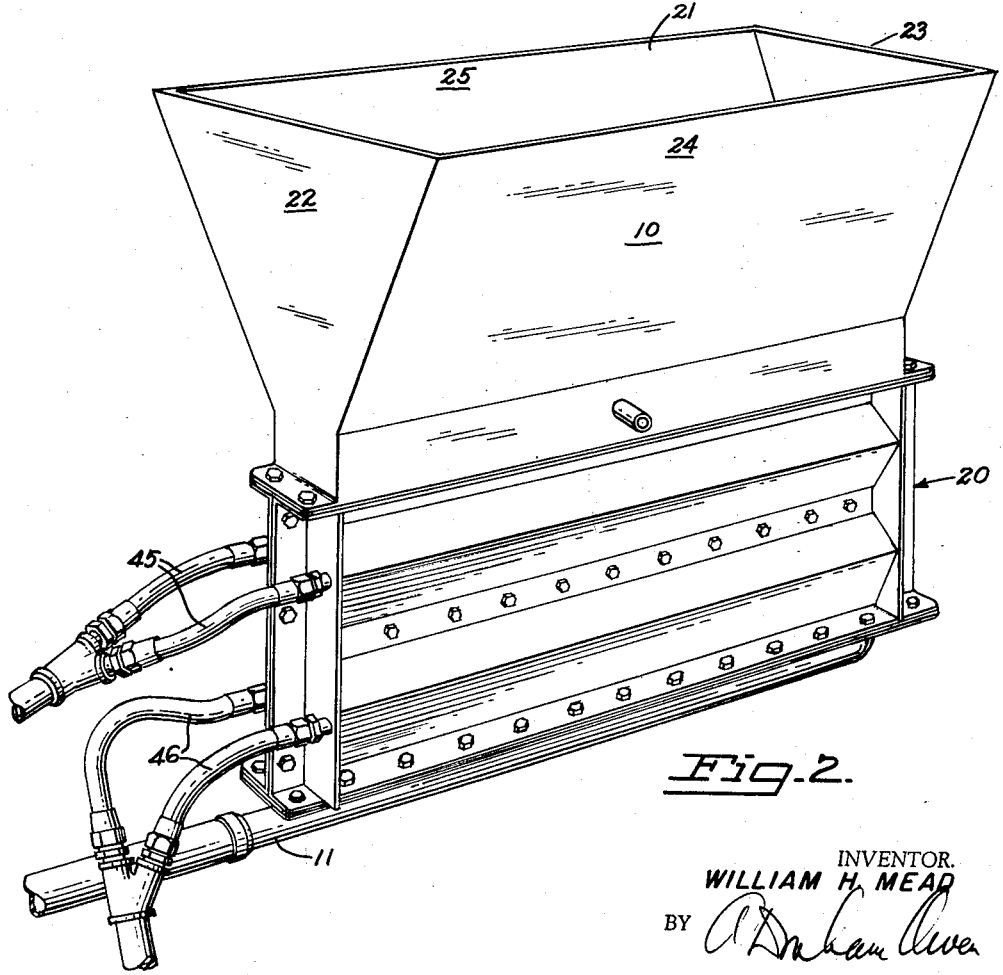
Fig. 2 is a perspective view of the hopper assembly of Fig. 1, which incorporates a valve embodying the principles of the present invention.

As shown in Fig. 2, the hopper 10 may be opened to the atmosphere at its upper end 21, and the granular material deposited in it there. At the bottom of the hopper is the valve 20 and beneath the valve 20 is the pressure line 11 into which the granular material is to be introduced. As shown in Figs. 2 and 3, the hopper 10 may be of extended length with substantially vertical or steeply sloping end walls 22 and 23 and sloping side walls 24 and 25. At the bottom of the hopper 10 is an opening 26 of extended length that leads into the valve 20. On each side of the opening 26 is an air-pervious aerating member 27, such as a plate of porous ceramic filter media, to serve as the diffuser for fluidizing air in a manner to be explained below. This aerating filter 27 may be supported above an air distribution plenum chamber 28.

The opening 26 leads directly into the valve 20, whose through passage is the same width and length as the opening 26. The valve 20 has a housing 30 that is preferably secured to the hopper 10, as by bolts 31 and flanges 32 and 33, and to the conveying line 11, by bolts 34 and flanges 35 and 36. The housing 30 is shaped to provide two pneumatic chambers 37 and 38.

Within the housing 30 and supported by it is a hollow elastic lining or conduit 40, preferably of pure gum rubber. For most of its area its outer surface 40 lies against the inner surface 42 of the housing 30, but at the chambers 37 and 38 the housing 30 diverges from the rubber lining 40. Fig. 4 shows the relaxed, inoperative position of the lining 40.

The chambers 37 and 38 are provided with respective ports 43 and 44 for air under pressure. Respective conduits 45 and 46 lead to a source 50 of air under pressure through three-way valves 51 and 52 (Fig. 10). When the valve 51 is in the "pressure" position, air under pressure fills the chamber 37 and collapses the lining 40 at a valve portion 53, as in Figs. 6 and 7, while when the valve 52 is in the "pressure" position, air under pressure fills the chamber 38 and collapses the lining 40 at a valve portion 54, as in Figs. 5 and 6. When the valve 51 moves to the "exhaust" position, air from the chamber 37 is bled by tubes 55 and 56 to the aerating plenum 28, whence it flows through filter 27 to fluidize the particulate material thereabove. Similarly, when the valve 52 is in the "exhaust" position, the air from the chamber 38 flows through tubes 57 and 56 to the plenum 28. The valve-closing pressure of the air in the chambers 37 and 38 is above the pressure to the line 11. For example, if the line pressure is 10 p.s.i., the chamber pressure may be 16 p.s.i. for closure, and atmospheric pressure when the valves 53 and 54 are to be in the "exhaust" position.

The unloading valve 20 may take air from line 11 via a line 58 and a booster blower 59 (Fig. 1) may then raise this pressure to the desired level, charging the air reservoir 50. The valves 51 and 52 may be three-way valves operated by solenoids 60 and 61 and a timer 62. The timer 62 may effect any desired cycle, such as a ten-second cycle, with each valve chamber closed 60% of the time, in alternate order.

When operating then, the valve 20 assumes the positions shown in Figs. 5, 6, and 7. First, the valve 53 is open and the valve 54 is closed, as in Fig. 5, allowing material to fall from the hopper 10 through the opening 16 into the central chamber 63 between the valves 53 and 54. Then the timer 62 causes the valve 53 to close, trapping a charge of granular material in the central chamber 63, as shown in Fig. 6. Next, the timer 62 causes the valve 54 to open, as in Fig. 7, dropping the charge of material into the line 11. Next, the timer 62 closes the valve 54, so that the valves 53 and 54 (as in Fig. 6) are closed with nothing in the chamber 63. Finally, the cycle begins again when the timer 62 opens the valve 53, as in Fig. 5, to receive the next charge. Meanwhile, the bleed system carries the exhaust air from the chambers 37 and 38 alternately through the filter 27 to aerate and fluidize the material in the bottom of the hopper 10.

For fine granular material the normal width between the side walls of the rubber valve member 40 may be as small as ¼" or smaller; and for larger material it may be much larger to accommodate lumps of material.

Figure 8:
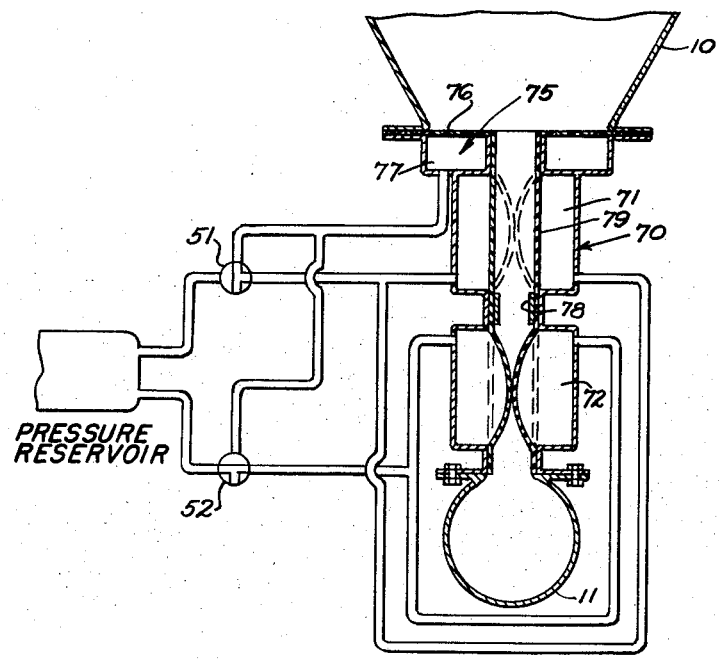
Fig. 8 is a view in elevation and in section of a modified form of valve also embodying the principles of this invention.

Fig. 8 shows a modified form of the invention wherein a valve 70 is like the valve 20 except that its pressure chambers 71 and 72 are rectangular in cross-section instead of triangular. The housing structure is somewhat different, but not in essentials. A somewhat different fluidizing apparatus 75 is employed, using a perforate plate 76 above chamber 77. Also, a band 78 is used to keep the rubber liner 79 from collapsing in between the pressure chambers 71 and 72.

Figure 9:
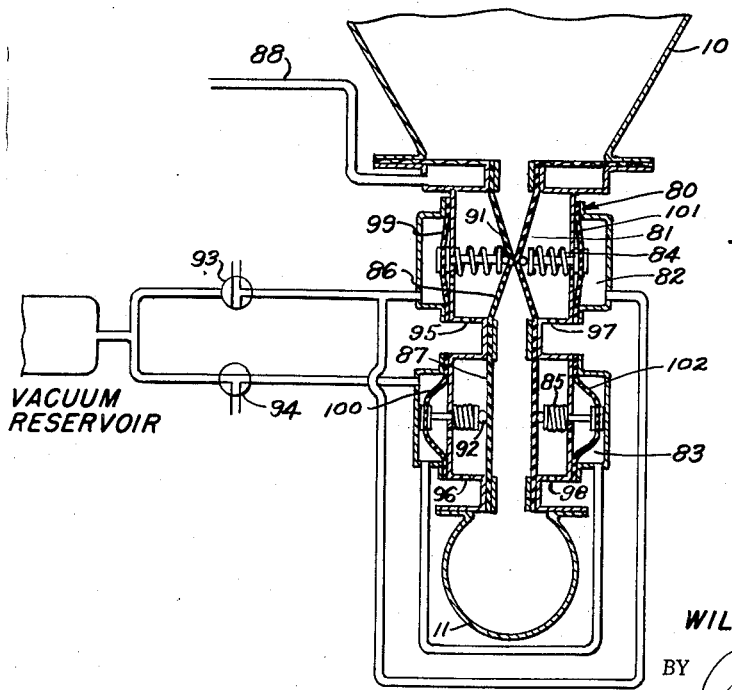
Fig. 9 is a view in elevation and in section of another modified form of the invention which is normally closed instead of normally open.

The device of Fig. 9 is different in its use of springs and of vacuum operation, used for a normally-closed valve, whereas the devices in Figs. 1–8 are normally open. Here the hopper 10 empties into a valve 80 with a rubber liner 81 and valve chambers 82 and 83, which are operated below atmospheric pressure. Springs 84 and 85 keep valve portions 86 and 87 of the liner 81 normally closed. In operation, the fluidizing air is obtained from a separate source through a pipe 88. Valves 93 and 94 control the vacuum status, alternately evacuating and bleeding the chambers 82 and 83, under timer control, as explained before. Atmospheric pressure is maintained against the diaphragms 99, 100, 101, 102 by vent holes 95, 96, 97, 98. The springs 84 and 85 act through bars 91 and 92 that run the length of the liner 81. Otherwise, operation is the same as described before.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. An unloading valve for transferring particulate material under gravity flow conditions from a hopper at one pressure to a duct below said hopper at a different pressure, said valve including in combination: a generally vertical elastic conduit connecting said hopper to said duct; two pneumatic control means for said conduit, one controlling an upper conduit portion and the other a lower conduit portion, and actuable for opening each said portion and for closing each said portion by collapsing its walls in against themselves, closure of each portion being effected by application of air under increased pressure to said portion by its said pneumatic control means and opening being effected by bleeding off the air applied during closure; conduit means for the bled-off air leading it to the lower portion of said hopper for fluidizing the particulate material therein; and timing means for alternating the actuation of said control means so as, first, to close said lower portion and then open said upper portion and, second, after an interval, to close said upper portion and then open said lower portion.

2. An unloading valve for transferring particulate material from a hopper at one pressure into a fluid stream which may be at another pressure, comprising: a valve housing connecting said hopper to said fluid stream; an elastic liner in said housing, portions of said housing being thereagainst and at least two portions being spaced therefrom to provide upper and lower pneumatic chambers outside upper and lower portions of said liner; air pressure means connected to each said chamber to collapse said liner thereat against itself and to close off passage therethrough; means for alternately applying pressure at timed intervals from said air pressure means to said two chambers for alternatingly collapsing said liner at each chamber whereby, when the upper portion is open, a charge falls from said hopper into said liner and is stopped by the closed lower portion, said upper portion then closes, trapping said charge, and said lower portion then opens and drops said charge into said fluid stream; air diffusing means in the lower end of said hopper to fluidize said particulate material; and means bleeding air from each said chamber to said air-diffusing means when said timed means disconnects said air-pressure means from that chamber.

3. An unloading valve for transferring particulate material from an elongated hopper at one pressure with a longitudinal slot at its lower end into a line below said hopper at another pressure, comprising: a generally vertical elongated valve housing connecting said hopper to said fluid stream, said housing being substantially the same size and shape in horizontal cross section as said hopper slot; an elastic gum rubber liner in said housing through which the material passes, said housing being provided with longitudinally extending portions spaced from longitudinal side walls of said liner to provide upper and lower pneumatic chambers outside said liner; pressure-changing means connected to each said chamber to collapse the longitudinal side walls of said liner thereat against themselves and to close off the passage therethrough at one pressure and to open said liner at another pressure; said liner under its own elasticity and normal shape opening at atmospheric pressure, said pressure-changing means applying superatmospheric pressure to close said liner; timed cycling means for alternating the application of said pressure-changing means to said two chambers for alternatingly collapsing said liner at one chamber and opening it at the other chamber; air-diffusing means along the longitudinal sides of said slot of said hopper; chamber means below said air-diffusing means; and bleed means from each chamber for channeling air under superatmospheric pressure to said chamber means when said cycling means opens the liner at that chamber, said air thereby fluidizing the particulate material in said hopper.

References Cited in the file of this patent

UNITED STATES PATENTS

| | | |
|---|---|---|
| 2,183,835 | Foulke | Dec. 19, 1939 |
| 2,470,744 | Korn | May 17, 1949 |
| 2,598,207 | Bailey | May 27, 1952 |
| 2,692,707 | Maxwell | Oct. 26, 1954 |
| 2,695,212 | Berg | Nov. 23, 1954 |